(12) United States Patent
Xian et al.

(10) Patent No.: US 9,971,211 B2
(45) Date of Patent: May 15, 2018

(54) ARRAY SUBSTRATE AND DISPLAY DEVICE

(71) Applicant: Boe Technology Group Co., Ltd., Beijing (CN)

(72) Inventors: Jianbo Xian, Beijing (CN); Yong Qiao, Beijing (CN); Hongfei Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 14/892,316

(22) PCT Filed: Apr. 27, 2015

(86) PCT No.: PCT/CN2015/077481
§ 371 (c)(1),
(2) Date: Nov. 19, 2015

(87) PCT Pub. No.: WO2016/107025
PCT Pub. Date: Jul. 7, 2016

(65) Prior Publication Data
US 2016/0357075 A1 Dec. 8, 2016

(30) Foreign Application Priority Data
Jan. 4, 2015 (CN) .................... 2015 2 0005449 U

(51) Int. Cl.
*H01L 27/14* (2006.01)
*G02F 1/1343* (2006.01)
*G02F 1/1368* (2006.01)

(52) U.S. Cl.
CPC ...... *G02F 1/134336* (2013.01); *G02F 1/1343* (2013.01); *G02F 1/1368* (2013.01); *G02F 1/134309* (2013.01)

(58) Field of Classification Search
CPC .................................. G02F 1/134336
USPC .......................................................... 257/72
See application file for complete search history.

(56) References Cited

U.S. PATENT DOCUMENTS

| 6,181,406 B1* | 1/2001 | Morimoto | G02F 1/13394 349/106 |
| 2002/0101558 A1* | 8/2002 | Nemeth | G02F 1/1309 349/192 |
| 2005/0140907 A1* | 6/2005 | Yun | G02F 1/133514 349/144 |

(Continued)

FOREIGN PATENT DOCUMENTS

| CN | 1460885 | 12/2003 |
| CN | 1573438 | 2/2005 |

(Continued)

OTHER PUBLICATIONS

International Search Report and Written Opinion from PCT/CN15/04481 dated Jun. 16, 2015.

*Primary Examiner* — Igwe U Anya
(74) *Attorney, Agent, or Firm* — Calfee, Halter & Griswold LLP

(57) ABSTRACT

The embodiments of the present invention provide an array substrate and a display device, which can reduce the phenomenon of point discharge for the pixel electrode. The array substrate comprises a plurality of pixel units; a pixel electrode is provided in each pixel unit; wherein at least one corner of at least one pixel electrode is provided with a notch.

6 Claims, 6 Drawing Sheets

(56) References Cited

U.S. PATENT DOCUMENTS

| | | | |
|---|---|---|---|
| 2011/0043741 A1* | 2/2011 | Hirato | G02F 1/133707 |
| | | | 349/143 |
| 2012/0326950 A1* | 12/2012 | Park | G09G 3/3607 |
| | | | 345/55 |
| 2013/0088681 A1* | 4/2013 | Hisada | G02F 1/134336 |
| | | | 349/144 |
| 2013/0222747 A1* | 8/2013 | Hisada | G02F 1/134336 |
| | | | 349/106 |

FOREIGN PATENT DOCUMENTS

| | | |
|---|---|---|
| CN | 102385200 | 3/2012 |
| CN | 103185997 | 7/2013 |
| WO | 2014/054449 | 4/2014 |

* cited by examiner

ARRAY SUBSTRATE AND DISPLAY DEVICE

The present application is the U.S. national stage entry of PCT/CN2015/077481, filed Apr. 27, 2015, which claims the benefit of Chinese Patent Application No. 201520005449.7, filed Jan. 4, 2015, the entire disclosures of which are incorporated herein by reference.

FIELD OF THE INVENTION

The present invention relates to the technical field of display, in particular to an array substrate and a display device.

BACKGROUND OF THE INVENTION

As a display device, TFT-LCD (Thin Film Transistor Liquid Crystal Display) has been used in high performance display field more and more because of its advantages of small size, low power consumption, free of radiation and low cost.

A TFT-LCD comprises an array substrate and a color film substrate. A liquid crystal layer is arranged between the array substrate and the color film substrate. Wherein the array substrate may comprise a plurality of crossed gate lines and data lines; a plurality of pixel units arranged in a matrix form are defined by the gate lines and data lines; and each pixel unit is provided with a pixel electrode and a TFT. A drain of the TFT is connected with the pixel unit. During display, a gate signal is input from a gate line, a line of TFTs are thus switched on; an data signal is then input from a data line, the data signal is transmitted from a source of the TFT to the drain of the TFT, charging the pixel electrode connected with the drain. An electric field is generated between the pixel electrode and the common electrode. Under the action of the electric field, the liquid crystal molecules corresponding to a position of the pixel electrode are deflected, realizing the control on light intensity; with the filtering function of the color film substrate, color image display can then be realized.

In order to simplify the production process, the pixel electrode is typically formed with a rectangular shape in the existing technology. However, in such a manner, point discharge occurs easily on the position of opposite corners between two adjacent pixel electrodes, which makes the charge distribution on the pixel electrodes is not uniform, thereby affecting the uniformity of the display image.

SUMMARY OF THE INVENTION

The embodiments of the present invention provide an array substrate and a display device, which can reduce the phenomenon of point discharge for the pixel electrode.

To this end, an embodiment of the present invention provides the following solution.

An aspect of the present invention provides an array substrate, the array substrate comprises a plurality of pixel units; a pixel electrode is provided in each pixel unit; at least one corner of at least one pixel electrode is provided with a notch.

Optionally, pixel electrodes in four pixel units respectively located in two adjacent rows and two adjacent columns form a first group of pixel electrodes; in the first group of pixel electrodes, at least one pair of obliquely opposite pixel electrodes have one pair of obliquely opposite notches; the array substrate is filled with an array of the first groups of pixel electrodes.

Optionally, pixel electrodes in four pixel units respectively located in two adjacent rows and two adjacent columns form a second group of pixel electrodes; in the second group of pixel electrodes, notches are provided respectively on adjacent corners of one pair of pixel electrodes in a same row, no notch is provided on the other pair of pixel electrodes in the other row; the notches are close to the pixel electrodes without notches; the array substrate is filled with an array of the second groups of pixel electrodes.

Optionally, the pixel electrodes provided with notches and the pixel electrodes without notches are arranged alternately in a column direction.

Optionally, if a first corner of the pixel electrode is provided with a thin film transistor, the notch is provided at a second corner of the pixel electrode; wherein the first corner and the second corner are two diagonally opposite corners of the pixel electrode.

Optionally, the shape of the notch is triangle.

Optionally, the shape of the notch is rectangle.

Optionally, an interface between the notch and the pixel electrode is a curved surface.

Optionally, the interface is an arc surface.

Another aspect of the present invention provides a display device, the display device comprises any one of the above mentioned array substrate.

The embodiments of the present invention provide an array substrate and a display device, wherein the array substrate comprises a plurality of pixel units; a pixel electrode is provided in each pixel unit; wherein at least one corner of at least one pixel electrode is provided with a notch. During display of images, the pixel electrodes are charged. Due to the notch provided at the at least one corner of the pixel electrode, a corner apt to produce point discharge is then eliminated. In such a manner, the phenomenon of point discharge at opposite corners of two laterally adjacent, vertically adjacent, or obliquely adjacent pixel electrodes can be reduced, making the charge distribution on the pixel electrodes uniform, thereby improving the display effect of the display device.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

REFERENCE SIGNS

10—pixel unit;
101—pixel electrode;
110—first group of pixel electrodes;
120—second group of pixel electrodes;
20—gate line;
21—data line;
22—common electrode line;
200—notch.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1A:
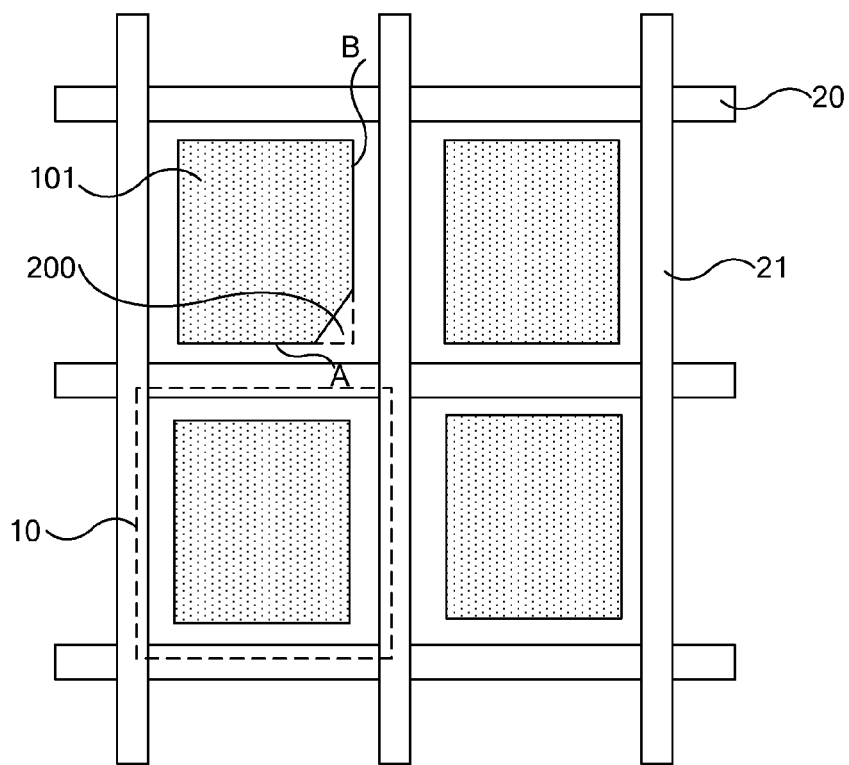
FIG. 1a is a structural schematic diagram of an array substrate provided by an embodiment of the present invention.
Figure 1B:
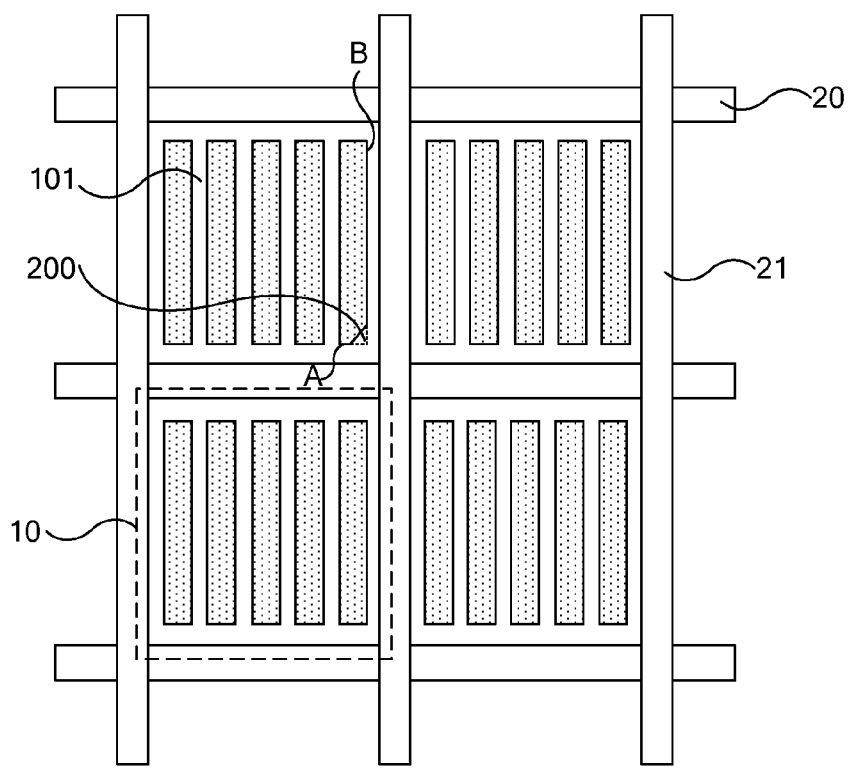
FIG. 1b is a structural schematic diagram of another array substrate provided by an embodiment of the present invention.

An embodiment of the present invention provides an array substrate, as shown in FIG. 1a or FIG. 1b, the array substrate can comprise a plurality of pixel units 10; a pixel electrode 101 is provided in each pixel unit 10; at least one corner of at least one pixel electrode 101 is provided with a notch 200. Wherein the pixel electrode 101 in FIG. 1a is rectangular; the pixel electrode 101 in FIG. 1b is formed with a plurality of rectangular electrodes.

It should be noted that: firstly, the pixel units 10 are defined with a plurality of crossed gate lines 10 and data lines 21; secondly, the notch 200 is provided on the intersection position of a first side A and a second side B of the pixel electrode 101. Wherein the first side A can be adjacent to a gate line 20; the second side B can be adjacent to a data line 21.

For the rectangular pixel electrode 101 shown in FIG. 1a, the first side A and the second side B are boundaries constituting a profile of the rectangular pixel electrode 101.

For the pixel electrode 101 composed of a plurality of rectangular electrodes (of which rectangular electrodes the length direction is parallel to the data lines) shown in FIG. 1b, the first side A is a side most close to a data line 21 among all the sides parallel to the gate lines 20; similarly, the second side B is a side most close to the data line 21 among all the sides of the rectangular electrode comprising the first side A, parallel to the data lines 21.

The embodiments of the present invention provide an array substrate and a display device, wherein the array substrate comprises a plurality of pixel units; a pixel electrode is provided in each pixel unit; wherein at least one corner of at least one pixel electrode is provided with a notch. During display of images, the pixel electrodes are charged. Due to the notch provided at the at least one corner of the pixel electrode, a corner apt to produce point discharge is then eliminated. In such a manner, the phenomenon of point discharge at opposite corners of two laterally adjacent, vertically adjacent, or obliquely adjacent pixel electrodes can be reduced, making the charge distribution on the pixel electrodes uniform, thereby improving the display effect of the display device.

The array substrates comprising pixel electrodes 101 provided with notches 200 are described in detail with the following embodiments.

Embodiment 1

Figure 2A:
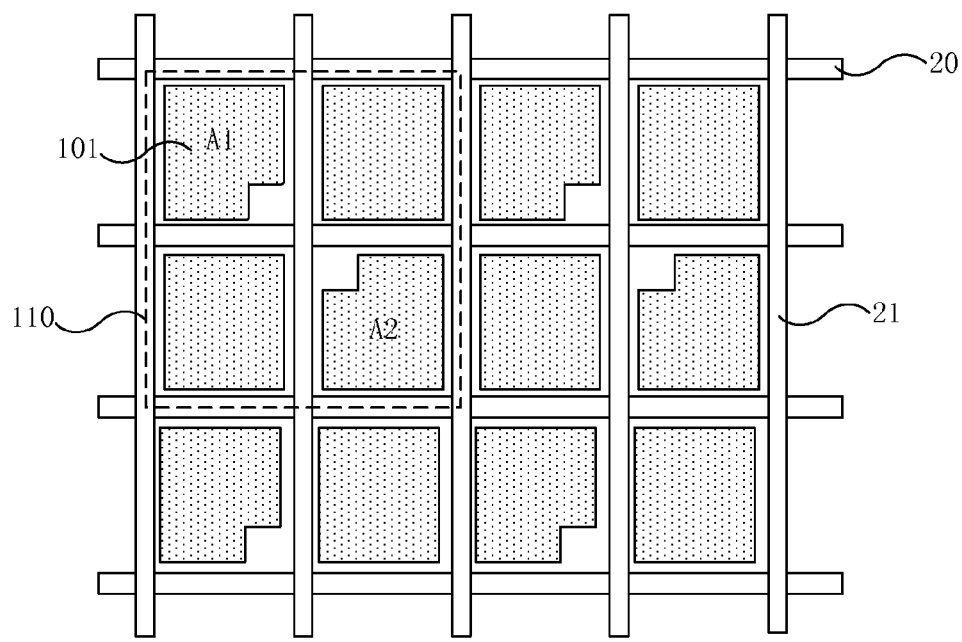
FIG. 2a is a structural schematic diagram of yet another array substrate provided by an embodiment of the present invention.

As shown in FIG. 2a, pixel electrodes 101 in four pixel units respectively located in two adjacent rows and two adjacent columns form a first group of pixel electrodes 110; in the first group of pixel electrodes 110, at least one pair of obliquely opposite pixel electrodes 101 (A1 and A2) have one pair of obliquely opposite notches; the array substrate is filled with an array of the first groups of pixel electrodes 110. In such a manner, the phenomenon of point discharge at opposite corners of two obliquely opposite pixel electrodes in two adjacent rows can be reduced. When a pixel electrode 101 in a row is being charged, the interference to the electric field of an obliquely opposite pixel electrode 101 in the next row can be reduced. Therefore, during the charging of the pixel electrodes 101 in obliquely opposite positions, the electric fields will not be affected, enabling a uniform charge distribution, improving the display effect.

Figure 2B:
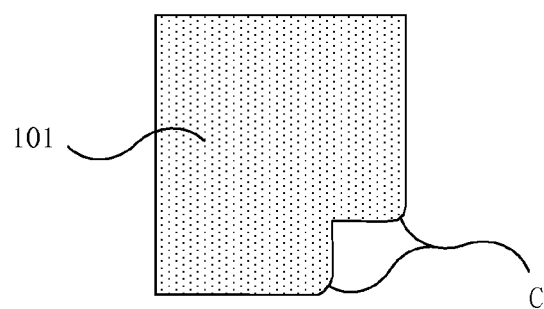
FIG. 2b is a structural schematic diagram of a pixel electrode provided by an embodiment of the present invention.

It should be noted that, the shape of the notch 200 is not limited herein. The shape can be either a triangle shown in FIG. 1a and FIG. 1b, or a rectangle shown in FIG. 2a. When the notch 200 is rectangular, as shown in FIG. 2b, the convex corners C on the position of the notch 200 can be arranged as round corners, thereby further eliminating the effect of point discharge.

Figure 2C:
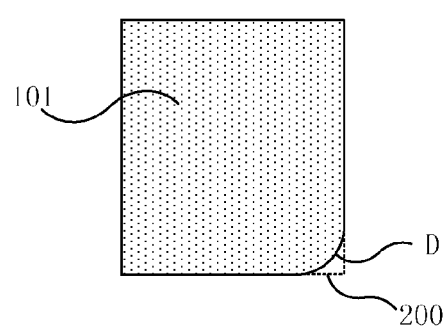
FIG. 2c is a structural schematic diagram of another pixel electrode provided by an embodiment of the present invention.
Figure 2D:
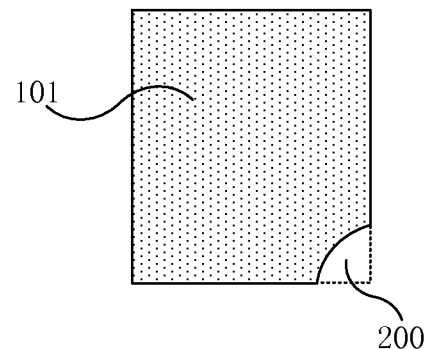
FIG. 2d is a structural schematic diagram of yet another pixel electrode provided by an embodiment of the present invention.

Furthermore, an interface D between the notch 200 and the pixel electrode 101 can be a curved surface, so as to eliminate the effect of point discharge effectively. The bending shape of the curved surface is not limited herein; the curved surface can have an irregular shape. Preferably, the curved surface can be an arc surface as shown in FIG. 2c. In such a manner, sharp corners on the intersection position of the interface and the first side A (or the second side B) can be avoided, and then point discharge can be eliminated. In FIG. 2c, the arc surface is convex. The arc surface can also be arranged concave, as shown in FIG. 2d; in this way, the shape of the notch is a sector.

The following embodiments of the present invention are all illustrated with examples, in which the pixel electrodes 101 are provided with notches 200 of convex arc surfaces.

Embodiment 2

Figure 3:
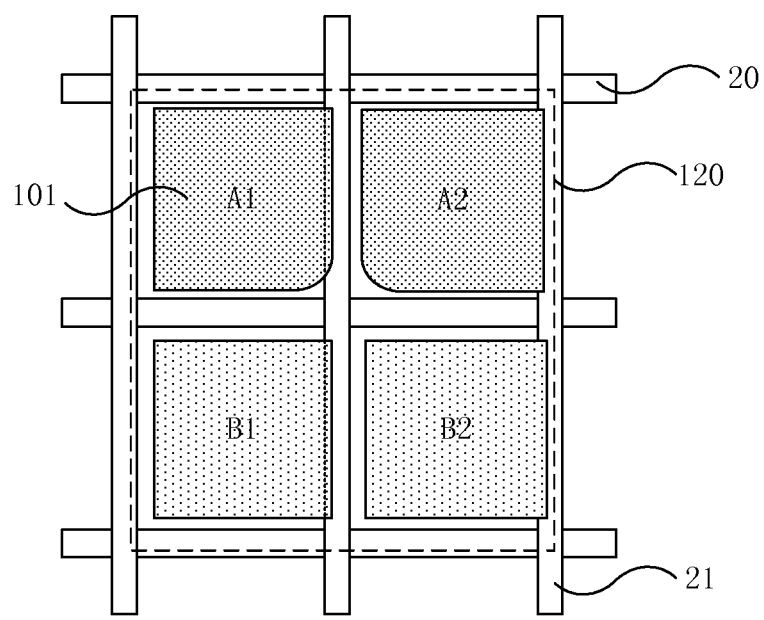
FIG. 3 is a structural schematic diagram of another array substrate provided by an embodiment of the present invention.

Two notches are provided symmetrically in two adjacent pixel electrodes in a same row. As shown in FIG. 3, pixel electrodes 101 in four pixel units respectively located in two adjacent rows and two adjacent columns form a second group of pixel electrodes 120; in the second group of pixel electrodes 120, notches are provided respectively on adjacent corners of one pair of pixel electrodes 101 (A1 and A2) in a same row, no notch is provided on the other pair of pixel electrodes 101 (B1 and B2) in the other row; the notches are close to the pixel electrodes 101 (B1 and B2) without notches; the array substrate is filled with an array of the second groups of pixel electrodes 120. The notches 20 are provided symmetrically in two adjacent pixel electrodes (A1 and A2) in a same row. In such a manner, the phenomenon of point discharge between two obliquely opposite pixel electrodes 101 can be reduced. In particular, a notch 200 is provided on the pixel electrode A1, therefore point discharge between two obliquely opposite pixel electrodes A1 and B2 can be reduced. Similarly, the phenomenon of point discharge between pixel electrodes A2 and B1 can also be reduced.

Furthermore, during the process of producing the array substrate, the pixel electrodes 101 can have partial overlapping areas with the data lines 21, thereby generating parasitic capacitance. In such a manner, if a notch 200 is provided on a corner of the pixel electrode 101, the phenomenon of point discharge can be reduced, and the area of the overlapping areas can also be decreased, thereby reducing the effect of the above mentioned parasitic capacitance.

Embodiment 3

Figure 4:
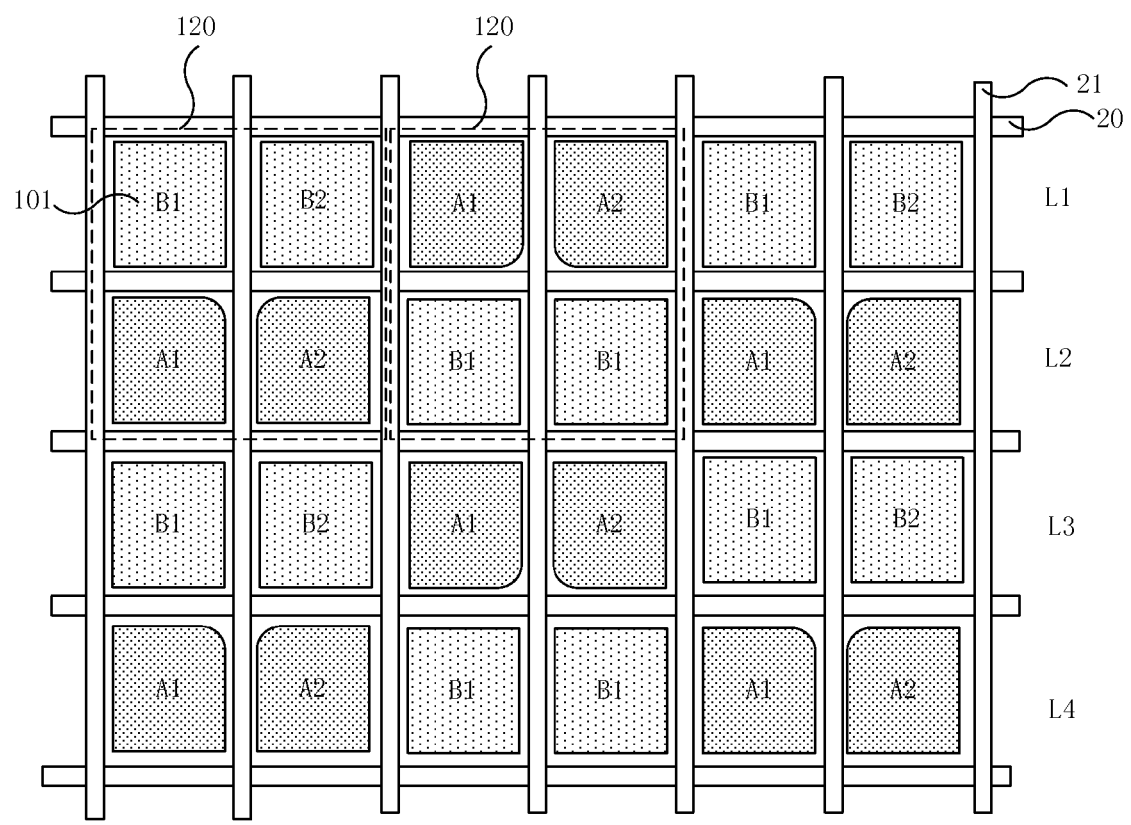
FIG. 4 is a structural schematic diagram of yet another array substrate provided by an embodiment of the present invention.

An array substrate is filled with an array of the second groups of pixel electrodes 120 as shown in FIG. 3; moreover, as shown in FIG. 4, the pixel electrodes provided with notches and the pixel electrodes without notches are arranged alternately in a column direction.

In particular, as shown in FIG. 4, point discharge between the pixel electrodes A1, A2 of the first row L1 and the pixel electrodes B1, B2 of the second row L2 can be avoided; point discharge between the pixel electrodes A1, A2 of the second row L2 and the pixel electrodes B1, B2 of the first row L1 can be avoided. Therefore, the charge distribution on each pixel electrode 101 of the first row L1 and the second row L2 is uniform. Similarly, the phenomenon of point discharge between the rows L3 and L4 can be reduced.

There is no notch provided between the pixel electrodes 101 of the row L2 and the row L3, thus point discharge may still occur. However, by providing such pixel electrodes A1, A2 and pixel electrodes B1, B2 respectively in L1 and L2 (and, respectively in L3 and L4), point discharge between the pixel electrodes 101 of L2 and L3 can also be weakened, thereby improving the color uniformity of adjacent pixels.

Embodiment 4

Figure 5A:
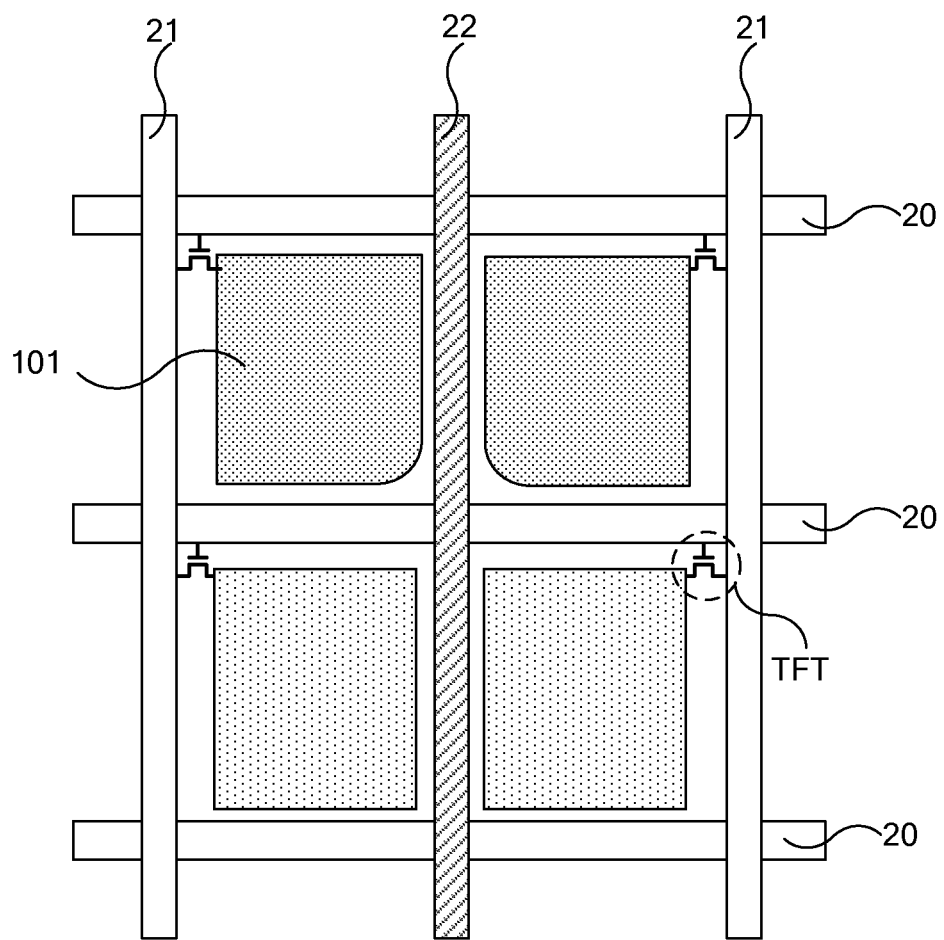
FIG. 5a is a structural schematic diagram of still another array substrate provided by an embodiment of the present invention.
Figure 5B:
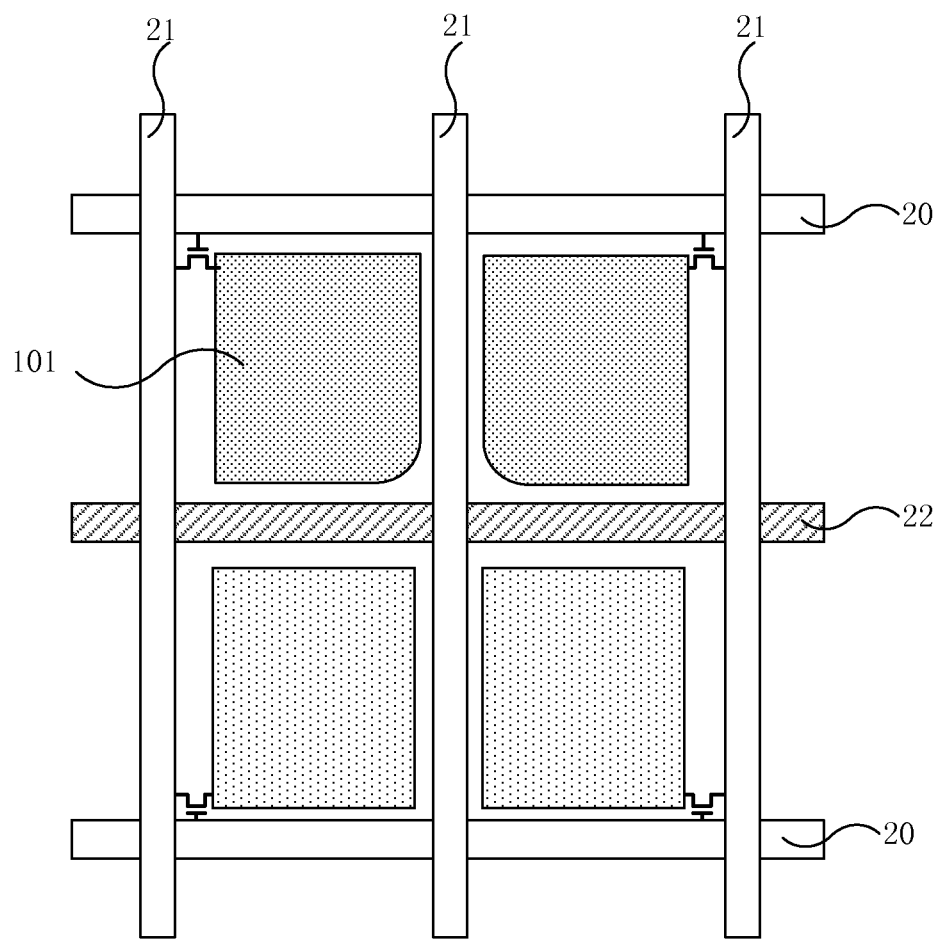
FIG. 5b is a structural schematic diagram of another array substrate provided by an embodiment of the present invention.

As shown in FIG. 5a and FIG. 5b, if a first corner of the pixel electrode 101 is provided with a thin film transistor, the notch is provided at a second corner of the pixel electrode 101; wherein the first corner and the second corner are two diagonally opposite corners of the pixel electrode 101.

The data voltage input from the data line 21 is transmitted from the source of the TFT to the drain of the TFT, then it is transmitted to the pixel electrode 101 connected with the drain. Therefore, the electric charges charged into the pixel electrode 101 will be transmitted from the corner with the TFT to a diagonally opposite position. When a notch 200 is provided on the diagonally opposite position, point discharge on this diagonally opposite position can be avoided, making the charge distribution on the pixel electrodes 101 uniform, thereby improving the electric field uniformity for the pixel units 10.

Furthermore, if common electrode lines 22 are provided on the array substrate, the positions of the common electrode lines 22 can be adjusted according to the arranged positions of the TFTs.

In particular, for example, the positions of the common electrode lines can be arranged between two pixel electrodes 101 with two symmetrically provided notches, as shown in FIG. 5a, and parallel to the data lines 21.

Or, as shown in FIG. 5b, the positions of the common electrode lines 22 can also be arranged between two rows of pixel electrodes 101, and parallel to the gate lines 20.

The present invention also provides a display device, the display device comprises any one of the above mentioned array substrate. The display device has the same structure and advantages as the array substrates provided by the above mentioned embodiments. Since the structure and advantages of the array substrates are described in detail with the above mentioned embodiments, they will not be repeated herein.

It should be noted that, in particular, the display device of the present invention can comprise liquid crystal display device; for example, the display device can be any product or component with display function, such as liquid crystal display, liquid crystal TV, digital photo frame, mobile phone, tablet computer and so on.

The above embodiments are only used for explanations rather than limitations to the present invention, the ordinary skilled person in the related technical field, in the case of not departing from the spirit and scope of the present invention, may also make various modifications and variations, therefore, all the equivalent solutions also belong to the scope of the present invention, the patent protection scope of the present invention should be defined by the claims.

The invention claimed is:

1. An array substrate comprising: a plurality of pixel units; wherein a pixel electrode is provided in each pixel unit; wherein at least one corner of at least one pixel electrode is provided with a notch; wherein pixel electrodes in four pixel units respectively located in two adjacent rows and two adjacent columns form a first group of pixel electrodes; in the first group of pixel electrodes, notches are provided respectively on adjacent corners of one pair of pixel electrodes in a same row, wherein no notch is provided on the other pair of pixel electrodes in the other row; wherein the notches are close to the pixel electrodes without notches; and wherein the array substrate is filled with an array of the first groups of pixel electrodes.

2. The array substrate according to claim 1, wherein the pixel electrodes provided with notches and the pixel electrodes without notches are arranged alternately in a column direction.

3. The array substrate according to claim 1, wherein if a first corner of the pixel electrode is provided with a thin film transistor, the notch is provided at a second corner of the pixel electrode; wherein the first corner and the second corner are two diagonally opposite corners of the pixel electrode.

4. A display device comprising the array substrate according to claim 1.

5. The display device according to claim 4, wherein the pixel electrodes provided with notches and the pixel electrodes without notches are arranged alternately in a column direction.

6. The display device according to claim 4, wherein if a first corner of the pixel electrode is provided with a thin film transistor, the notch is provided at a second corner of the pixel electrode; wherein the first corner and the second corner are two diagonally opposite corners of the pixel electrode.

* * * * *